United States Patent
Kim

(10) Patent No.: US 8,988,007 B2
(45) Date of Patent: Mar. 24, 2015

(54) DRIVE VOLTAGE GENERATION CIRCUIT FOR LIGHT EMITTING DIODE DISPLAY DEVICE AND METHOD FOR DRIVING THE SAME

(71) Applicant: LG Display Co., Ltd., Seoul (KR)

(72) Inventor: Byeong-Hee Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 322 days.

(21) Appl. No.: 13/705,931

(22) Filed: Dec. 5, 2012

(65) Prior Publication Data
US 2013/0162175 A1    Jun. 27, 2013

(30) Foreign Application Priority Data
Dec. 26, 2011   (KR) .................. 10-2011-0142381

(51) Int. Cl.
H05B 37/02    (2006.01)
G09G 3/32     (2006.01)
H05B 33/08    (2006.01)

(52) U.S. Cl.
CPC ............ *H05B 37/02* (2013.01); *G09G 2330/04* (2013.01); *G09G 3/3225* (2013.01); *G09G 2330/028* (2013.01); *H05B 33/0815* (2013.01); *Y02B 20/346* (2013.01); *Y02B 20/341* (2013.01)
USPC ............................. 315/307; 315/291; 315/308

(58) Field of Classification Search
None
See application file for complete search history.

(56) References Cited

U.S. PATENT DOCUMENTS

| 7,999,486 B2* | 8/2011 | Wang et al. | 315/291 |
| 8,228,005 B2* | 7/2012 | Ohtaka et al. | 315/307 |
| 2003/0137254 A1 | 7/2003 | Bang | |
| 2011/0025234 A1* | 2/2011 | Ohtaka et al. | 315/307 |
| 2011/0254469 A1* | 10/2011 | Ruan et al. | 315/307 |

FOREIGN PATENT DOCUMENTS

| CN | 101093936 A | 12/2007 |
| CN | 101820220 A | 9/2010 |
| JP | 2011-097789 | 5/2011 |

OTHER PUBLICATIONS

Office Action issued in Chinese Patent Application No. 201210350334.2, mailed Sep. 23, 2014, 8 pages.

* cited by examiner

*Primary Examiner* — Long Nguyen
(74) *Attorney, Agent, or Firm* — Brinks Gilson & Lione

(57) ABSTRACT

A drive voltage generation circuit for an LED display device capable of increasing the input voltage range thereof is disclosed. The drive voltage generation circuit includes a booster that boosts an input voltage from an external source, to generate a boosted voltage, a protection switching element that controls whether or not the boosted voltage generated from the booster is to be output, in accordance with a switch control signal, a protection circuit that compares a level of the boosted voltage output from the booster via the protection switching element with a predetermined threshold voltage, selects one of a high voltage and a low voltage, based on a result of the comparison, and outputs the selected voltage as the switch control signal, and a discharger that discharges a low voltage node, to which the low voltage is applied.

19 Claims, 6 Drawing Sheets

DRIVE VOLTAGE GENERATION CIRCUIT FOR LIGHT EMITTING DIODE DISPLAY DEVICE AND METHOD FOR DRIVING THE SAME

This application claims the benefit of the Korean Patent Application No. 10-2011-0142381, filed on Dec. 26, 2011, which is hereby incorporated by reference as if fully set forth herein.

BACKGROUND

1. Field of the Disclosure

The present disclosure relates to a voltage supply circuit of a light emitting diode (LED) display device, and more particularly, to a drive voltage generation circuit for an LED display device capable of increasing the input voltage range thereof.

2. Discussion of the Related Art

Pixels of a light emitting diode (LED) display device include respective LEDs. Each LED emits light in accordance with drive current generated by a drive voltage.

The drive voltage is generated from a drive voltage generation circuit. That is, the voltage generation circuit generates a drive voltage, based on an input voltage from an external source. The drive voltage generation circuit includes an internal protection circuit. The protection circuit functions to interrupt output of the drive voltage when the input voltage abnormally increases. However, there may be a problem in that, even when an input voltage having a normal level is input, the protection circuit may interrupt output of the drive voltage, due to an internal offset voltage thereof. There may be another problem in that, when the external input voltage is lowered to a certain voltage level, the protection circuit may also interrupt output of the drive voltage, due to the internal offset voltage thereof, even if the lowered input voltage is within a normal voltage range.

SUMMARY

A drive voltage generation circuit for a light emitting diode (LED) display device includes a booster that boosts an input voltage from an external source, to generate a boosted voltage, a protection switching element that controls whether or not the boosted voltage generated from the booster is to be output, in accordance with a switch control signal, a protection circuit that compares a level of the boosted voltage output from the booster via the protection switching element with a predetermined threshold voltage, selects one of a high voltage and a low voltage, based on a result of the comparison, and outputs the selected voltage as, the switch control signal, and a discharger for discharging a low voltage node, to which the low voltage is applied.

In another aspect of the present invention, a method for driving a drive voltage generation circuit for a light emitting diode (LED) display device, the drive voltage generation circuit including a booster for boosting an input voltage from an external source, to generate a boosted voltage, a protection switching element for controlling whether or not the boosted voltage generated from the booster is to be output, in accordance with a switch control signal, and a protection circuit for comparing a level of the boosted voltage output from the booster via the protection switching element with a predetermined threshold voltage, selecting one of a high voltage and a low voltage, based on a result of the comparison, and outputting the selected voltage as the switch control signal, includes discharging a low voltage node, to which the low voltage is applied.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention.

In the drawings.

DETAILED DESCRIPTION OF THE EXEMPLARY EMBODIMENT

Reference will now be made in detail to the preferred embodiments of the present invention, examples of which are illustrated in the accompanying drawings. Wherever possible, the same reference numbers will be used throughout the drawings to refer to the same or like parts.

Figure 1:
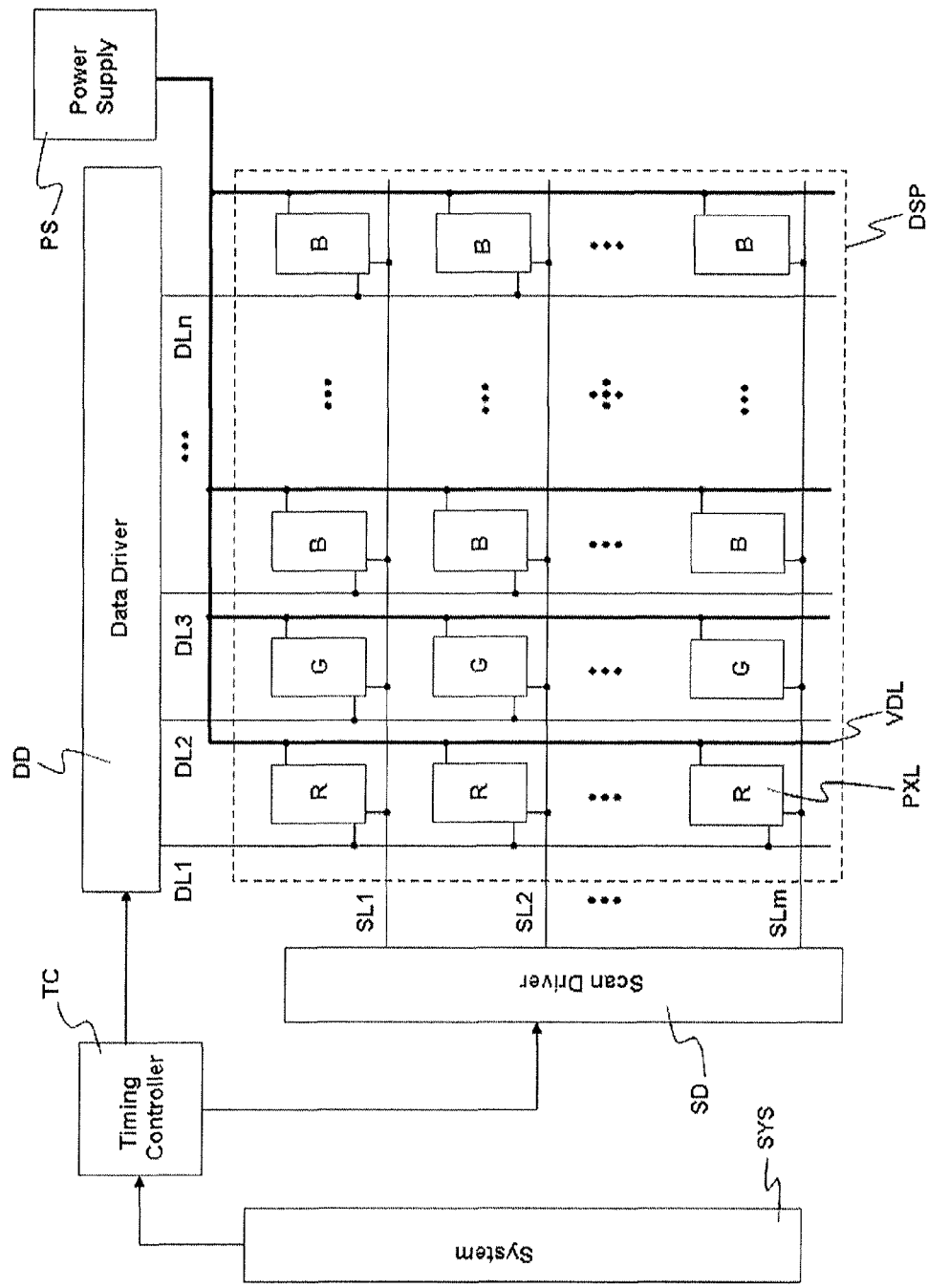
FIG. 1 is a block diagram illustrating a light emitting diode (LED) display device according to an exemplary embodiment of the present invention.

FIG. 1 is a block diagram illustrating a light emitting diode (LED) display device according to an exemplary embodiment of the present invention.

As shown in FIG. 1, the LED display device according to the illustrated embodiment of the present invention includes a display unit DSP, a system SYS, a scan driver SD, a data driver DD, a timing controller TC, and a power supplier PS.

The display unit DSP includes a plurality of pixels PXL. In order to transmit various signals required to enable the pixels PXL to display an image, the display unit DSP also includes a plurality of scan lines SL1 to SLm, a plurality of data lines DL1 to DLn, and a plurality of voltage supply lines. In FIG. 1, only a part of the voltage supply lines, namely, drive voltage supply lines VDL, are shown.

The pixels PXL are arranged on the display unit DSP in the form of a matrix array. The pixels PXL are divided into red pixels PXL to display red, green pixels PXL to display green, and blue pixels PXL to display blue.

The system SYS outputs a vertical sync signal, a horizontal sync signal, a clock signal and image data via an interface circuit, using a low voltage differential signaling (LVDS) transmitter of a graphic controller. The vertical sync signal, horizontal sync signal and clock signal output from the system SYS are supplied to the timing controller TC. The image data sequentially output from the system SYS is supplied to the timing controller TC.

The timing controller TC generates a data control signal, a scan control signal, and a light emission control signal, using the horizontal sync signal, vertical sync signal and clock signal input thereto. The signals generated from the timing controller TC are supplied to associated ones of the data driver DD and scan driver SD. The data control signal includes a dot clock, a source shift clock, a source enable signal, a polarity reversal signal, etc. The scan control signal includes a scan start signal, a scan shift clock, a scan output enable signal, etc.

The data driver DD samples the image data in accordance with the data control signal from the timing controller TC, and latches the sampled image data for every one horizontal line during every horizontal time 1H, 2H, . . . . The data driver DD supplies the latched image data to the data lines DL1 to DLn. That is, the data driver DD converts image data from the timing controller TC into an analog pixel signal (data signal), using a gamma voltage input from the power supplier PS, and supplies the analog pixel signal to the data lines DL1 to DLn.

The scan driver SD includes a shift register to sequentially generate scan signals in response to scan start pulses from the timing controller TC, and a level shifter to shift each of the scan signals to a voltage level suitable for driving of the pixels PXL. The scan driver SD sequentially supplies scan pulses to the scan lines SL1 to SLm in response to a scan control signal from the timing controller TC.

The power supplier PS generates a gamma voltage, a drive voltage, a ground voltage, and a reference voltage required for driving of the pixels PXL. To this end, the power supplier PS includes a gamma voltage generation circuit to generate the gamma voltage, a drive voltage generation circuit to generate the drive voltage, a ground voltage generation circuit to generate the ground voltage, and a reference voltage generation circuit to generate the reference voltage. The drive voltage VDD generated from the drive voltage generation circuit is supplied to the pixels PXL via the drive voltage supply line VDL.

The pixels PXL have the same configuration. Hereinafter, the configuration of the pixels PXL will be described in detail with reference to FIG. 2.

Figure 2:
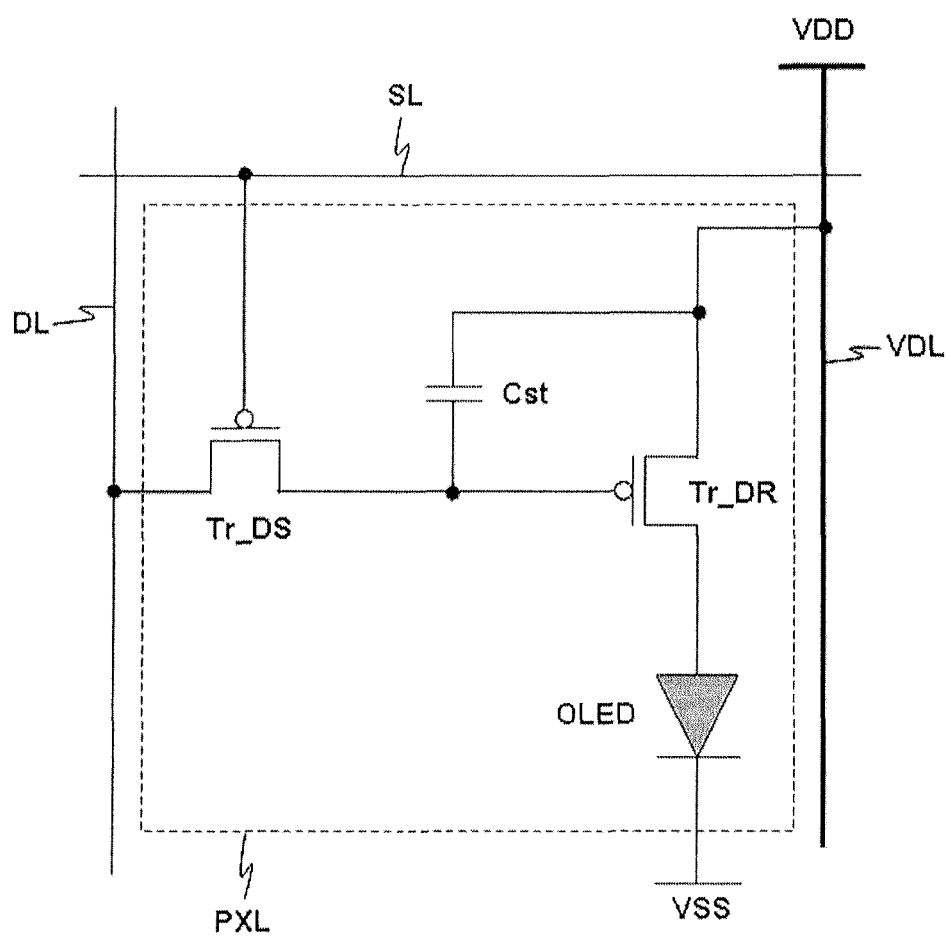
FIG. 2 is a circuit diagram illustrating a circuit configuration included in one of the pixels shown in FIG. 1.

FIG. 2 is a circuit diagram illustrating a circuit configuration included in one of the pixels shown in FIG. 1.

As shown in FIG. 2, the pixel PXL includes a data switching element Tr_DS, a drive switching element Tr_DR, a storage capacitor Cst, and a light emitting diode OLED.

The data switching element Tr_DS switches a data voltage from the data line DL in accordance with a scan signal from the scan line SL. To this end, the data switching element Tr_DS has a gate electrode connected to the scan line SL, a source electrode connected to the data line DL, and a drain electrode connected to a gate electrode of the drive switching element Tr_DR.

The drive switching element Tr_DR adjusts the amount of drive current in accordance with the data voltage switched by the data switching element Tr_DS. To this end, the drive switching element Tr_DR is connected, at the gate electrode thereof, to the drain electrode of the data switching element Tr_DS. Also, the drive switching element Tr_DR includes a source electrode connected to the drive voltage supply line VDL, and a drain electrode connected to an anode electrode of the light emitting diode OLED.

The storage capacitor Cst is connected between the gate and source electrodes of the drive switching element Tr_DR.

The light emitting diode OLED is connected between the drain electrode of the drive switching element Tr_DR and the ground voltage supply line. That is, the light emitting diode OLED is connected, at the anode electrode thereof, to the drain electrode of the drive switching element Tr_DR while being connected, at a cathode electrode thereof, to the ground voltage supply line. The light emitting diode OLED emits light in accordance with the drive current from the drive switching element Tr_DR.

Hereinafter, the configuration of the drive voltage generation circuit shown in FIG. 1 will be described in detail.

Figure 3:
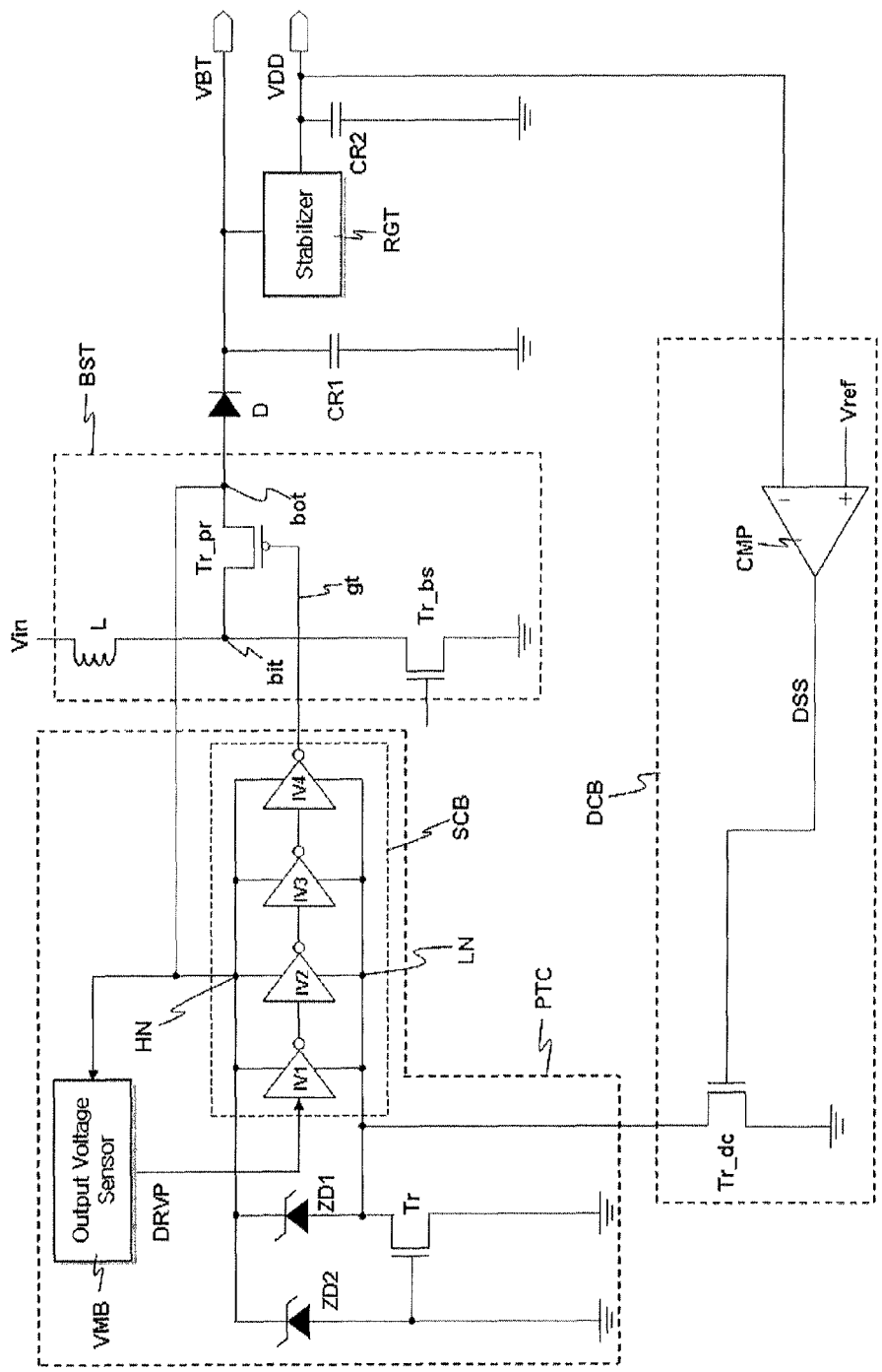
FIG. 3 is a circuit diagram illustrating a detailed configuration of a drive voltage generation circuit according to a first embodiment of the present invention.

FIG. 3 is a circuit diagram illustrating a detailed configuration of the drive voltage generation circuit according to a first embodiment of the present invention.

In accordance with the first embodiment of the present invention, as shown in FIG. 3, the drive voltage generation circuit includes a booster BST, a protection circuit PTC, a diode D, a first stabilizing capacitor CR1, a stabilizer RGT, a second stabilizing capacitor CR2, and a discharger DCB.

The booster BST boosts an input voltage Vin applied thereto from an external source, to generate a boosted voltage, and outputs the boosted voltage. The booster BST includes a boosting input terminal bit and a boosting output terminal bot. The external input voltage Vin is input to the booster BST through the boosting input terminal bit. The boosted voltage is output through the boosting output terminal bot.

For the above-described boosting operation, the booster BST includes an inductor L and a boosting switching element Tr_bs.

The inductor L is connected between an input line (not shown) to supply the external input voltage Vin and the boosting input terminal bit. The inductor L is installed at the outside of the booster BST due to a large size thereof.

The boosting switching element Tr_bs is controlled in accordance with a drive pulse output from a pulse mode selector (not shown). The boosting switching element Tr_bs is connected between the boosting input terminal bit and a ground terminal. To this end, the boosting switching element Tr_bs includes a gate electrode connected to an output terminal of the pulse mode selector, a drain electrode connected to a boosting input terminal bit, and a source electrode connected to the ground terminal.

Meanwhile, a protection switching element Tr_pr is provided within the booster BST. The protection switching element Tr_pr is functionally included in the constituent elements of the protection circuit PTC.

Hereinafter, operation of the booster BST, which has the above-described configuration, will be described.

The boosting switching element Tr_bs periodically turns on and off in accordance with the drive pulse supplied from the pulse mode selector. When the boosting switching element Tr_bs is turned on, current generated by the input voltage Vin flows to the ground terminal via the inductor L, so that energy is accumulated in the inductor L. Due to accumulation of such energy, the voltage at the boosting input terminal bit is boosted. The voltage exhibited across the boosting input terminal bit is a boosting voltage. This boosting voltage has a higher level than the input voltage Vin. When the boosting switching element Tr_bs is subsequently turned off, the boosting voltage at the boosting input terminal bit is supplied to the boosting output terminal bot via the protection switching element Tr_pr. In this case, when the protection switching element Tr_pr turns on, the boosting voltage at the boosting input terminal bit is applied to the boosting output terminal bot. On the other hand, when the protection switching element Tr_pr turns off, the boosting voltage at the boosting input terminal bit cannot be applied to the boosting output terminal bot.

The protection circuit PTC is used to protect the drive voltage generation circuit and pixels from over-voltage, along with the protection switching element Tr_pr. That is, when the external input voltage Vin increases abnormally due to noise, etc., an over-voltage may be generated. The protection circuit PTC is used to protect the drive voltage generation circuit from over-voltage. To this end, the protection circuit PTC turns off the protection switching element Tr_pr when the level of the boosted voltage output from the booster BST exceeds a predetermined threshold value, thereby interrupting output of the boosted voltage. Thus, the protection circuit PTC protects the drive voltage generation circuit and pixels from over-voltage.

In detail, the protection circuit PTC compares the level of the boosted voltage output from the booster BST via the protection switching element Tr_pr with a predetermined threshold voltage. Based on the comparison result, the protection circuit PTC selects a high voltage or a low voltage, and outputs the selected voltage as a switch control signal. The switch control signal output from the protection circuit PTC is supplied to a gate electrode of the protection switching element Tr_pr, to control operation of the protection switching element Tr_pr.

In addition to the protection switching element Tr_pr, the protection circuit PTC includes an output voltage sensor VMB, a switch controller SCB, a first zener diode ZD1, a second zener diode ZD2, and a switching element Tr.

The output voltage sensor VMB generates and outputs a control voltage DRVP, which is a source of the switch control signal. The output voltage sensor VMB compares the level of the boosted voltage applied to the boosting output terminal bot with the threshold voltage. Upon determining, based on the comparison result, that the boosted voltage is higher than the threshold voltage, the output voltage sensor VMB outputs the control voltage DRVP after inverting the logic of the control voltage DRVP. For example, when the boosted voltage at the boosting output terminal bot is lower than or equal to the threshold voltage, the output voltage sensor VMB outputs a control voltage DRVP with a low logic. On the other hand, when the boosted voltage at the boosting output terminal bot exceeds the threshold voltage, the output voltage sensor VMB inverts the low-logic control voltage DRVP, and outputs the inverted control voltage DRVP, which has a high logic.

The switch controller SCB selects a high voltage or a low voltage in accordance with the logic of the control voltage DRVP from the output voltage sensor VMB, and outputs the selected voltage as the switch control signal. For example, when the control voltage DRVP from the output voltage sensor VMB has a low logic, the switch controller SCB outputs the low voltage as the switch control signal. On the other hand, when the control voltage DRVP from the output voltage sensor VMB has a high logic, the switch controller SCB outputs the high voltage as the switch control signal.

The switch controller SCB includes a plurality of inverters IV1 to IV4 connected in series. That is, the inverters IV1 to IV4 are connected in series between an output terminal of the output voltage sensor VMB and the gate electrode gt of the protection switching element Tr_pr. The inverters IV1 to IV4 receive the boosted voltage from the boosting output terminal bot, as the high voltage. To this end, a high voltage node HN is electrically connected to the boosting output terminal bot. Also, the inverters IV1 to IV4 receive a voltage from a low voltage node LN, as the low voltage. The plural inverters IV1 to IV4 sequentially invert the control voltage DRVP from the output voltage sensor VMB, to generate the switch control signal, which is, in turn, supplied to the gate electrode gt of the protection switching element Tr_pr.

The number of inverters included in the switch controller SCB is two or more. In particular, the number of the inverters is an even number such that the logic of the switch control signal output from the inverter positioned at a final output stage (the fourth inverter IV4 positioned at a rightmost stage in the illustrated case) is identical to the logic of the control voltage DRVP input from the output voltage sensor VMB. Accordingly, when the low-logic control voltage DRVP from the output voltage sensor VMB is supplied, the first to fourth inverters IV1 to IV4 output a high-logic output, a low-logic output, a high-logic output, and a low-logic output in a sequential manner, respectively. Thus, when the boosted voltage at the boosting input terminal bit has a normal level lower than or equal to the threshold voltage, that is, when the output voltage sensor VMB outputs the low-logic control voltage DRVP, the low-logic switch control signal is output from the fourth inverter IV4 of the switch controller SCB. On the other hand, when the boosted voltage at the boosting input terminal bit has an abnormal level higher than the threshold voltage, that is, when the output voltage sensor VMB outputs the high-logic control voltage DRVP, the high-logic switch control signal is output from the fourth inverter IV4 of the switch controller SCB.

The inverters IV1 to IV4 decrease the control voltage DRVP, which has a high voltage level, to a selected one of the high and low voltages, which has a lower voltage level than the control voltage DRVP, in order to enable a protection switching element Tr_pr having a reduced size to be used. When the control voltage DRVP is directly applied to the gate electrode gt of the protection switching element Tr_pr, increased stress is applied to the protection switch element Tr_pr. The stress applied to the protection switching element Tr_pr may be reduced by reducing the voltage level of the control voltage DRVP through the inverters IV1 to IV4.

The inverters may have the following configuration.

Figure 4:
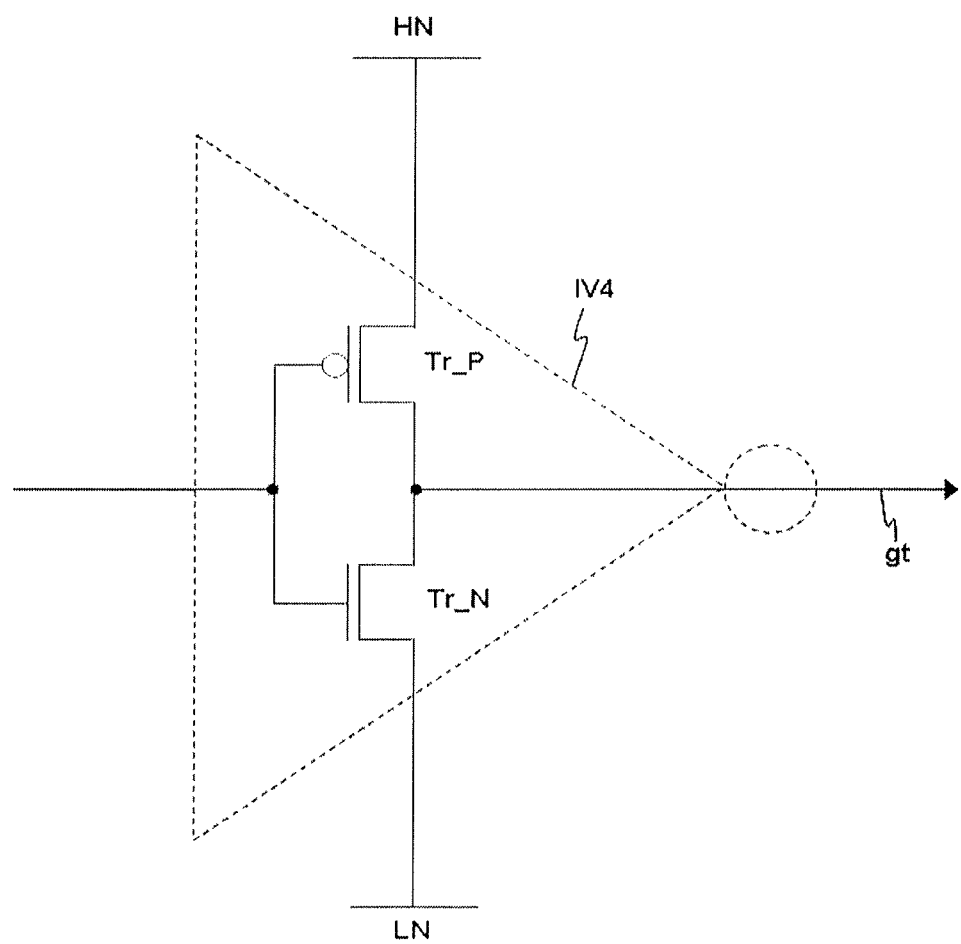
FIG. 4 is a circuit diagram illustrating a configuration of a fourth inverter shown in FIG. 3.

FIG. 4 is a circuit diagram illustrating the configuration of the fourth inverter shown in FIG. 3.

As shown in FIG. 4, the fourth inverter IV4 includes a first switching element Tr_P, which is of a P type, and a second switching element Tr_N, which is of an N type.

The first switching element Tr_P is controlled by an output from the third inverter IV3. The first switching element Tr_P is connected between the high voltage node HN and the gate electrode gt.

The second switching element Tr_N is controlled by an output from the third inverter IV3. The second switching element Tr_N is connected between the low voltage node LN and the gate electrode gt.

When the output from the third inverter IV3 has a high logic, the first switching element Tr_P turns off, whereas the second switching element Tr_N turns on. In this case, accordingly, the low voltage is output through the turned-on second switching element Tr_N. The low voltage is supplied to the gate electrode gt, as a switching control signal.

On the other hand, when the output from the third inverter IV3 has a low logic, the first switching element Tr_P turns on, whereas the second switching element Tr_N turns off. In this case, accordingly, the high voltage is output through the turned-on first switching element Tr_P. The high voltage is supplied to the gate electrode gt, as a switching control signal.

Although not shown, the remaining first to third inverters IV1 to IV3 have the same configuration as the above-described fourth inverter IV4.

The first zener diode ZD1 is connected between the high voltage node HN and the low voltage node LN. The first zener diode ZD1 is a clamping diode. Accordingly, the potential between the high voltage node HN and the low voltage node LN is set by the clamping voltage of the first zener diode ZD1. The boosting output terminal bot is maintained at an initial voltage lower than the boosted voltage before the boosted voltage is applied thereto. When the boosting output terminal bot is maintained at the initial voltage, the low voltage node LN is maintained at 0V in a floating state by the first zener diode ZD1. On the other hand, when the boosting output terminal bot is boosted to the boosted voltage, the low voltage node LN is maintained at a difference voltage between the boosted voltage and the clamping voltage.

The second zener diode ZD2 is connected between the high voltage node HN and the ground terminal. The second zener diode ZD2 is also a clamping diode. The clamping voltage of the second zener diode ZD2 is set to be higher than the clamping voltage of the first zener diode ZD1.

The switching element Tr is controlled in accordance with a voltage applied to an anode electrode of the second zener diode ZD2. The switching element Tr is connected between the low voltage node LN and the ground terminal. When the initial voltage is applied to the boosting output terminal bot, the gate electrode of the switching element Tr is maintained at 0V because the initial voltage is lower than the clamping voltage of the second zener diode ZD2. Accordingly, when the initial voltage is applied to the boosting output terminal bot, the switching element Tr turns off. On the other hand, when the boosting output terminal bot is boosted to the boosted voltage, the gate electrode of the switching element Tr is maintained at a difference voltage between the boosted voltage and the clamping voltage (the clamping voltage of the second zener diode ZD2) by the boosted voltage. Accordingly, when the boosted voltage is applied to the boosting output terminal bot, the switching element Tr turns on. The switching element Tr is used to establish a current path for increasing the potential of the low voltage node LN to a potential according to the clamping voltage when the boosting output terminal bot is boosted to the boosted voltage. Meanwhile, the switching element Tr is maintained in an off state at an initial driving point (at the point of time when an enable signal EN is rendered to an active state), which will be described later, because the boosting output terminal is maintained at the initial voltage at the initial driving point.

The protection switching element Tr_pr controls whether or not the boosted voltage generated from the booster BST should be output, in accordance with the switch control signal from the switch controller SCB. For example, it is assumed that the protection switching element Tr_pr is a P-type transistor, as shown in FIG. 3. Then, when the switch control signal from the switch controller SCB has a low logic, the protection switching element Tr_pr turns on. In this case, accordingly, the boosted voltage at the boosting input terminal bit can be transferred to the boosting output terminal bot. On the other hand, when the switch control signal from the switch controller SCB has a high logic, the protection switching element Tr_pr turns off. In this case, accordingly, the boosted voltage at the boosting input terminal bit cannot be transferred to the boosting output terminal bot. Thus, when the boosted voltage at the boosting output terminal bot has a normal level, the protection switching element Tr_pr transfers the boosted voltage of the boosting input terminal bit to the boosting output terminal bot. On the other hand, when the boosted voltage at the boosting output terminal bot has an abnormal level, the protection switching element Tr_pr prevents the boosted voltage of the boosting input terminal bit from being transferred to the boosting output terminal bot.

The diode D rectifies the boosted voltage output through the protection switching element Tr_pr, and then supplies the rectified voltage to the stabilizer RGT. To this end, the diode D is connected, at an anode electrode thereof, to the boosting output terminal bot, while being connected, at a cathode electrode thereof, to an input terminal of the stabilizer RGT.

The first stabilizing capacitor CR1 stabilizes the boosted voltage VBT rectified by the diode D, to reduce ripple of the boosted voltage. To this end, the first stabilizing capacitor CR1 is connected between the cathode electrode of the diode D and the ground terminal.

The stabilizer RGT stabilizes the boosted voltage VBT output through the booster BST and diode D, and outputs a stabilized voltage, namely, a drive voltage VDD. To this end, the stabilizer RGT is connected, at an input terminal thereof, to the boosting output terminal bot via the diode D. The drive voltage VDD output from the stabilizer RGT is supplied to the drive voltage supply line VDL and discharger DCB. The stabilizer RGT is a regulator. A low dropout (LDO) regulator may be used.

The second stabilizing capacitor CR2 again stabilizes the drive voltage VDD from the stabilizer RGT, to reduce ripple of the drive voltage VDD. To this end, the second stabilizing capacitor CR2 is connected between the output terminal of the stabilizer RGT and the ground terminal.

The discharger DCB discharges the low voltage node LN of the switch controller SCB. That is, the discharger DCB applies a particular voltage to the low voltage node LN, to discharge the low voltage node LN. For example, the discharger DCB discharges the voltage of the low voltage node LN to a ground level (namely, a voltage of 0V). Meanwhile, the discharger DCB may apply a voltage lower than the ground level, namely, a negative voltage, to the low voltage node LN.

In particular, the discharger DCB discharges the low voltage node LN to the ground level at the point of time when the enable signal EN is rendered to an active state. Here, the enable signal EN is a start signal for activating various drive circuits of the LED display device including the drive voltage generation circuit. When the enable signal EN is rendered to an active state, the screen of the LED display device is turned on. On the other hand, when the enable signal EN is rendered to an inactive state, the screen of the LED display device is turned off. Also, the enable signal EN is switched to the inactive state when the LED display device is switched to a sleep mode (a mode in which the light emitting diodes OLED of the LED display device are turned off to turn off the screen, in order to reduce power consumption). Meanwhile, the enable signal EN is again switched to the active state when the LED display device is switched from the sleep mode to a wake mode (a mode in which the screen of the LED display device is recovered to an original display state in response to button depression or screen touch.

When the enable signal EN is rendered to the active state (for example, the state in which the enable signal EN has a high-logic voltage), the booster BST, protection circuit PTC, stabilizer RGT, and discharger DCB begin to operate. For example, at the point of time when the enable signal EN is rendered to the active state, the booster BST operates such that the external input voltage Vin is input to the booster BST.

In the present invention, the discharger DCB discharges the low voltage node LN to the ground level at the point of time when the enable signal EN is rendered to the active state, in order to allow the protection switching element Tr_pr to normally turn on even when the input voltage Vin is low. This will be described in more detail.

When the LED display device of the present invention is applied to a mobile phone, the input voltage Vin may be supplied from a battery. When a sufficient amount of power remains in the battery, the input voltage Vin supplied from the battery is sufficiently high. In this case, the protection switching element Tr_pr turns on when the input voltage Vin is within a normal voltage range that does not exceed the threshold voltage. However, when the input voltage Vin supplied from the battery is low in accordance with a reduction in power of the battery caused by an increased use time of the mobile phone, the protection switching element Tr_pr may not turn on, even if the input voltage Vin is still within the normal voltage range that does not exceed the threshold voltage. That is, whether the protection switching element Tr_pr turns on or off is determined based on the difference voltage between the voltage applied to the gate electrode of the protection switching element Tr_pr (the output terminal of the switch controller SCB) and the source electrode of the protection switching element Tr_pr (the boosting input terminal bit) (hereinafter, the difference voltage is referred to as a "gate-source voltage"). When the input voltage Vin applied to the source electrode is dropped to a certain voltage or below, the gate-source voltage of the protection switching element Tr_pr may be lower than the threshold voltage of the protection switching element Tr_pr. In this case, the protection switching element Tr_pr may turn off, even if the input voltage Vin is within the normal voltage range. Also, the level of the gate-source voltage of the protection switching element Tr_pr is influenced by the voltage at the gate electrode, which is also influenced by the level of the low voltage supplied to the inverters. That is, when the voltage at the low voltage node LN is maintained at a particular positive voltage level by an offset voltage of the inverters IV1 to 1V4, the voltage at the gate electrode gt, to which the low voltage is applied, is also maintained at the particular voltage level. In this case, the level of the gate-source voltage may also be dropped such that the gate-source voltage is lower than the threshold voltage. As a result, the protection switching element Tr_pr may turn off, even if the input voltage Vin has a normal voltage level.

To this end, in the first embodiment of the present invention, the low voltage node LN is discharged to the ground level at every initial driving point (every point of time when the enable signal EN is rendered to an active state), using the discharger DCB, in order to lower the voltage of the gate electrode gt at the point of time when the input voltage Vin is input, and thus to relatively increase the gate-source voltage (increase in a negative direction). Accordingly, even when the input voltage Vin is low, a normal boosted voltage is generated. As a result, a normal drive voltage VDD is generated. Thus, the drive voltage generation circuit according to the first embodiment of the present invention can be driven by the input voltage Vin, which is within a considerably wide voltage range. Accordingly, there may also be an additional effect in that the use time of the battery is increased.

Meanwhile, when the input voltage Vin is stabilized in accordance with normal boosting thereof through the protection switching element Tr_pr, it is unnecessary to further discharge the low voltage node LN, in order to avoid further power consumption. To this end, the discharger DCB stops the operation of discharging the low voltage node LN, immediately after sensing a state in which the drive voltage VDD output from the stabilizer RGT reaches a normal level.

The discharger DCB may have the following configuration.

That is, as shown in FIG. 3, the discharger DCB includes a comparator CMP and a discharge switching element Tr_dc.

The comparator CMP compares the drive voltage VDD from the stabilizer RGT with a predetermined reference voltage Vref. Based on the comparison result, the comparator CMP outputs a discharge start signal DSS, which is in an active state or in an inactive state. That is, the comparator CMP includes a non-inverting terminal (+), an inverting terminal (−), and an output terminal. The reference voltage Vref is input to the non-inverting terminal (+), and the drive voltage VDD is input to the inverting terminal (−). The discharge start signal DSS is output from the output terminal. When the drive voltage VDD is lower than the reference voltage Vref, the comparator CMP generates an active discharge start signal DSS. On the other hand, when the drive voltage VDD is equal to or higher than the reference voltage Vref, the comparator CMP does not generates an output. That is, when the drive voltage VDD is equal to or higher than the reference voltage Vref, the comparator CMP outputs an inactive discharge start signal DSS.

In response to the active discharge start signal DSS from the comparator CMP, the discharge switching element Tr_dc discharges the low voltage node LN to the ground level. That is, the discharge switching element Tr_dc turns on only when the discharge switching element Tr_dc receives the active discharge start signal DSS from the comparator CMP, to supply a voltage of the ground level to the low voltage node LN. To this end, the discharge switching element Tr_dc is connected, at a gate electrode thereof, to the output terminal of the comparator CMP while being connected, at a drain terminal (or a source terminal) thereof, to the low voltage node LN. Also, the source terminal (or the drain terminal) of the discharge switching element Tr_dc is connected to the ground terminal.

Meanwhile, as described above, the discharger DCB may apply, to the low voltage node LN, a voltage lower than the ground level, namely, a negative voltage. In this case, the discharge switching element Tr_dc is not connected to the ground terminal, but is connected to a negative voltage source (not shown) for supplying a negative voltage.

Here, the drive voltage VDD and reference voltage Vref are generated when the enable signal EN is in an active state. On the other hand, when the enable signal EN is in an inactive state, both the drive voltage VDD and the reference voltage Vref are lowered to the ground level. In other words, when the enable signal EN is switched to an active state, the drive voltage VDD and reference voltage Vref are maintained in an active state, in response to the active state of the enable signal EN. On the other hand, when the enable signal EN is switched to an inactive state, the drive voltage VDD and reference voltage Vref are maintained in an inactive state, in response to the inactive state of the enable signal EN.

Figure 5:
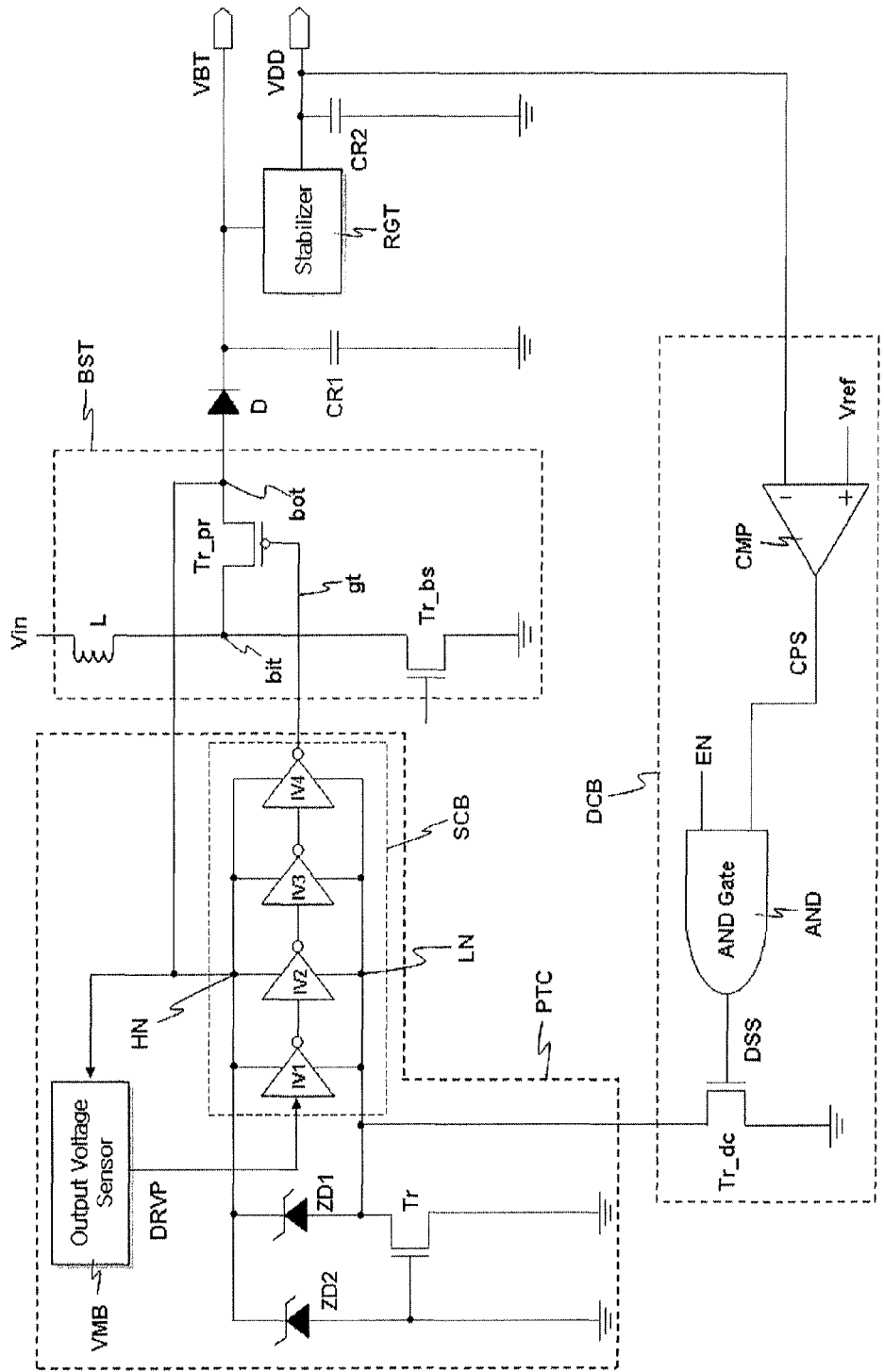
FIG. 5 is a circuit diagram illustrating a detailed configuration of the drive voltage generation circuit according to a second embodiment of the present invention.

FIG. 5 is a circuit diagram illustrating a detailed configuration of the drive voltage generation circuit according to a second embodiment of the present invention.

In accordance with the second embodiment of the present invention, as shown in FIG. 5, the drive voltage generation circuit includes a booster BST, a protection circuit PTC, a diode D, a first stabilizing capacitor CR1, a stabilizer RGT, a second stabilizing capacitor CR2, and a discharger DCB. The booster BST, protection circuit PTC, diode D, first stabilizing capacitor CR1, stabilizer RGT, and second stabilizing capacitor CR2 according to the second embodiment of the present invention are identical to those of the above-described first embodiment and, as such, the description thereof may be referred to the first embodiment.

As shown in FIG. 5, the discharger DCB according to the second embodiment of the present invention includes a comparator CMP, an AND gate AND, and a discharge switching element Tr_dc.

The comparator CMP compares the drive voltage VDD from the stabilizer RGT with a predetermined reference voltage Vref. Based on the comparison result, the comparator CMP outputs a comparative signal CPS, which is in an active state or in an inactive state. That is, the comparator CMP includes a non-inverting terminal (+), an inverting terminal (−), and an output terminal. The reference voltage Vref is input to the non-inverting terminal (+), and the drive voltage VDD is input to the inverting terminal (−). The comparative signal CMP is output from the output terminal. When the drive voltage VDD is lower than the reference voltage Vref, the comparator CMP generates an active comparative signal CPS. On the other hand, when the drive voltage VDD is equal to or higher than the reference voltage Vref, the comparator CMP does not generates an output. That is, when the drive voltage VDD is equal to or higher than the reference voltage Vref, the comparator CMP outputs a low-logic comparative signal CPS.

The AND gate AND receives the enable signal EN and comparative signal CPS, and outputs a discharge start signal DSS, which is in an active state, when both the enable signal EN and the comparative signal CPS are in an active state. That is, the AND gate AND, which receives the enable signal EN and comparative signal CPS, and generates an high-logic output when both the enable signal EN and the comparative signal CPS are in a high logic state. On the other hand, when any one of the enable signal EN and comparative signal CPS is in a low logic state, the AND gate AND generates a low-logic output.

In response to the active discharge start signal DSS from the AND gate AND, the discharge switching element Tr_dc discharges the low voltage node LN to the ground level. That is, the discharge switching element Tr_dc turns on only when the discharge switching element Tr_dc receives the high-logic output from the AND gate AND (that is, the active discharge start signal DSS), to supply a voltage of the ground level to the low voltage node LN. To this end, the discharge switching element Tr_dc is connected, at a gate electrode thereof, to the output terminal of the AND gate AND while being connected, at a drain terminal (or a source terminal) thereof, to the low voltage node LN. Also, the source terminal (or the drain terminal) of the discharge switching element Tr_dc is connected to the ground terminal.

Meanwhile, as described above, the discharger DCB may apply, to the low voltage node LN), a voltage lower than the ground level, namely, a negative voltage. In this case, the discharge switching element Tr_dc is not connected to the ground terminal, but is connected to a negative voltage source (not shown) for supplying a negative voltage).

Thus, in the second embodiment of the present invention, the low voltage node LN is discharged to the ground level at every initial driving point (every point of time when the enable signal EN is rendered to an active state), using the discharger DCB, in order to lower the voltage of the gate electrode gt at the point of time when the input voltage Vin is input, and thus to relatively increase the gate-source voltage (increase in a negative direction). Accordingly, even when the input voltage Vin is low, a normal boosted voltage is generated. As a result, a normal drive voltage VDD is generated. Thus, the drive voltage generation circuit according to the second embodiment of the present invention can be driven by the input voltage Vin, which is within a considerably wide voltage range. Accordingly, there may also be an additional effect in that the use time of the battery is increased.

Figure 6:
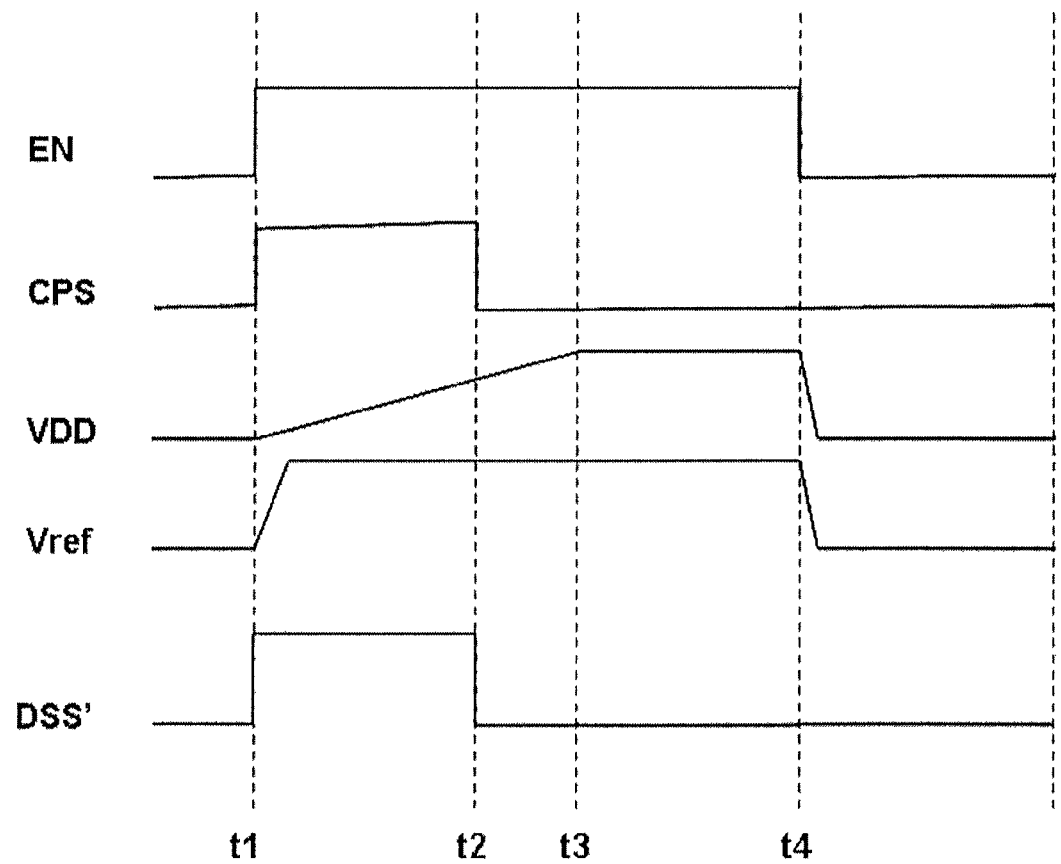
FIG. 6 is a timing diagram of an enable signal, a comparative signal, a drive voltage, a reference voltage, and a discharge start signal associated with FIG. 5.

FIG. 6 is a timing diagram of the enable signal EN, comparative signal CPS, drive voltage VDD, reference voltage Vref, and discharge start signal DSS associated with FIG. 5.

As shown in FIG. 6, when the enable signal EN is rendered to an active state at a time point t1, the drive voltage VDD is gradually boosted in response to the active state of the enable signal EN. That is, at the time point t1 when the enable signal EN is rendered to an active state, the input voltage Vin is supplied to the booster BST. The booster BST then boosts the input voltage Vin, and outputs the boosted voltage. Thereafter, the stabilizer RGT stabilizes the boosted voltage, and outputs the stabilized voltage as the drive voltage VDD. In this case, the drive voltage VDD is slowly boosted for a period of time from the time point t1 to a time point t2, and reaches a target voltage level at a time point t3. Also, at the time point t1, the reference voltage Vref begins to transition to an active state (high-logic state). Before the time point t2, the comparator CMP outputs the high-logic comparative signal CPS because the drive voltage VDD is lower than the reference voltage Vref. Thereafter, the drive voltage VDD is gradually boosted. Thus, the drive voltage VDD has the same level as the reference voltage Vref at the time point t2. Accordingly, the comparator CMP outputs the low-logic comparative signal CPS at the time point t2. Thus, the AND gate AND outputs the high-logic discharge start signal DSS for a period of time from the time point t1 to a time point just before the time point t2, in which both the enable signal EN and the comparative signal CPS are in a high logic state.

On the other hand, at a time point t4 when the enable signal EN transitions to an inactive state, both the drive voltage VDD and the reference voltage Vref are dropped to the ground level.

The discharger DCB according to the second embodiment of the present invention can reduce power consumption, even when the LED display device is driven in a dimming low power (DLP) mode. This will be described in more detail.

The DLP mode is a mode in which, when the LED display device is switched to a sleep mode, only the light emitting diodes D included in a part of pixels emit light to display a predetermined particular image (for example, a clock or a calendar) on the screen of the LED display device. This DLP mode is also included in the sleep mode. In the DLP mode, accordingly, there is no drive voltage VDD generated from the drive voltage generation circuit. However, in the DLP mode, a drive voltage internally generated from the data driver DD is supplied to the pixel part, to enable the light emitting diodes D of the pixel part to emit light. The drive voltage generated from the data driver DD is also supplied to the output terminal of the stabilizer RGT. As a result, the drive voltage generated from the data driver DD is also input to the comparator CMP because the output terminal of the stabilizer RGT is connected to the non-inverting terminal of the comparator CMP, as described above. In this case, the comparator CMP outputs the high-logic comparative signal CPS because the drive voltage VDD is higher than the reference voltage Vref. In the DLP mode, however, the AND gate AND still outputs the low-logic discharge start signal DSS, even when the high-logic comparative signal CPS is input to the AND gate AND, because the enable signal EN supplied to the AND gate AND is in an inactive state. Thus, in the DLP mode, power consumption can also be reduced because the discharge switching element Tr_dc is still in an off state and, as such, the drive voltage generation circuit is not required to operate, even though a drive voltage is generated.

As apparent from the above description, the drive voltage generation circuit for the LED display device according to the present invention and the method for driving the same have the following effects.

That is, in accordance with the present invention, the voltage of the gate electrode of the protection switching element is dropped to the ground level at a point of time when an input voltage is input, to relatively increase the gate-source voltage of the protection switching element. Accordingly, even when the input voltage is low, a normal boosted voltage is generated, so that a normal drive voltage is generated. Thus, the drive voltage generation circuit of the present invention can be driven by an input voltage of a considerably wide range. As a result, there may also be an additional effect in that the use time of the battery is increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A drive voltage generation circuit for a light emitting diode (LED) display device comprising:
    a booster that boosts an input voltage from an external source, to generate a boosted voltage;
    a protection switching element that controls whether or not the boosted voltage generated from the booster is to be output, in accordance with a switch control signal;
    a protection circuit that compares a level of the boosted voltage output from the booster via the protection switching element with a predetermined threshold voltage, selects one of a high voltage and a low voltage, based on a result of the comparison, and outputs the selected voltage as the switch control signal; and
    a discharger that discharges a low voltage node, to which the low voltage is applied.

2. The drive voltage generation circuit according to claim 1, wherein the discharger discharges the low voltage node to a ground level.

3. The drive voltage generation circuit according to claim 2, wherein the discharger discharges the low voltage node to the ground level at a point of time when an enable signal to activate the drive voltage generation circuit is rendered to an active state.

4. The drive voltage generation circuit according to claim 3, further comprising:
    a stabilizer that stabilizes the boosted voltage output from the booster, and outputs the stabilized voltage as a drive voltage.

5. The drive voltage generation circuit according to claim 4, further comprising:
    a diode that rectifies the boosted voltage output via the protection switching element;
    a first stabilizing capacitor that stabilizes the booted voltage rectified by the diode; and
    a second stabilizing capacitor that stabilizes the drive voltage from the stabilizer.

6. The drive voltage generation circuit according to claim 4, wherein:
    the discharger comprises
        a comparator that compares the drive voltage from the stabilizer with a reference voltage, and outputs an active discharge start signal upon determining, based on a result of the comparison, that the drive voltage is lower than the reference voltage, and
        a discharge switching element that discharges the low voltage node to the ground level in response to the active discharge start signal from the comparator; and
    wherein the drive voltage and the reference voltage are generated when the enable signal is in the active state, and are dropped to the ground level when the enable signal is in an inactive state.

7. The drive voltage generation circuit according to claim 4, wherein the discharger comprises:
    a comparator that compares the drive voltage from the stabilizer with a reference voltage, and outputs an active comparative signal upon determining, based on a result of the comparison, that the drive voltage is lower than the reference voltage;
    an AND gate that receives the enable signal and the comparative signal, and outputs an active discharge start signal upon determining, based on a result of the comparison, that both the enable signal and the comparative signal are in an active state; and
    a discharge switching element that discharges the low voltage node to the ground level in response to the active discharge start signal from the AND gate.

8. The drive voltage generation circuit according to claim 1, wherein the discharger discharges the low voltage node to a negative voltage.

9. The drive voltage generation circuit according to claim 8, wherein the discharger discharges the low voltage node to the negative voltage at a point of time when an enable signal to activate the drive voltage generation circuit is rendered to an active state.

10. The drive voltage generation circuit according to claim 1, wherein:
    the booster comprises
        an inductor connected to an input line to supply the input voltage from the external source and a boosting input terminal, and
        a boosting switching element controlled in accordance with a drive pulse from an external source, and connected between the boosting input terminal and a ground terminal; and
    wherein the protection switching element is connected between the boosting input terminal and a boosting output terminal, to electrically connect the boosting input terminal and the boosting output terminal or to electrically separate the boosting input terminal and the boosting output terminal from each other, in accordance with the switch control signal.

11. The drive voltage generation circuit according to claim 10, wherein the protection circuit comprises:
    an output voltage sensor that outputs a control voltage as a source of the switch control signal, the output voltage sensor inverting a logic of the control voltage when a boosting voltage applied to the boosting output terminal has a level exceeding the threshold voltage, and outputs the logic-inverted control voltage;
    a switch controller that selects one of the high voltage and the low voltage in accordance with the logic of the control voltage from the output voltage sensor, and outputs the selected voltage as the switch control signal;
    a first zener diode connected between the low voltage node and a high voltage node, to which the boosting voltage is supplied from the boosting output terminal;
    a second zener diode connected between the high voltage node and the ground terminal; and a switching element controlled in accordance with a voltage applied to an anode electrode of the second zener diode, and connected between the low voltage node and the ground terminal.

12. The drive voltage generation circuit according to claim 11, wherein:
   the switch controller comprises a plurality of inverters connected in series, the inverters receiving the boosting voltage of the high voltage node as the high voltage while receiving the voltage of the low voltage node as the low voltage; and
   wherein the plural inverters sequentially invert the control voltage from the output voltage sensor, to generate the switch control signal, and supply the switch control signal to a gate electrode of the protection switching element.

13. A method for driving a drive voltage generation circuit for a light emitting diode (LED) display device, the drive voltage generation circuit including a booster for boosting an input voltage from an external source, to generate a boosted voltage, a protection switching element for controlling whether or not the boosted voltage generated from the booster is to be output, in accordance with a switch control signal, and a protection circuit for comparing a level of the boosted voltage output from the booster via the protection switching element with a predetermined threshold voltage, selecting one of a high voltage and a low voltage, based on a result of the comparison, and outputting the selected voltage as the switch control signal, the method comprising:
   discharging a low voltage node, to which the low voltage is applied.

14. The method according to claim 13, wherein the low voltage node is discharged to a ground level.

15. The method according to claim 14, wherein the low voltage node is discharged to the ground level at a point of time when an enable signal to activate the drive voltage generation circuit is rendered to an active state.

16. The method according to claim 15, further comprising:
   stabilizing a boosting voltage output from the booster, to generate a drive voltage;
   wherein, at the step of discharging the low voltage node, the drive voltage is compared with a predetermined reference voltage, and the low voltage node is discharged to the ground level upon determining, based on a result of the comparison, that the drive voltage is lower than the reference voltage, and
   wherein the drive voltage and the reference voltage are generated when the enable signal is in the active state, and are dropped to the ground level when the enable signal is in an inactive state.

17. The method according to claim 15, further comprising:
   stabilizing the boosting voltage output from the booster, to generate a drive voltage,
   wherein the step of discharging the low voltage node comprises
      comparing the drive voltage with a predetermined reference voltage, and generating a comparative signal, which is in an active state, upon determining, based on a result of the comparison, that the drive voltage is lower than the reference voltage, and
      discharging the low voltage node to the ground level when both the enable signal and the comparative signal are in an active state.

18. The method according to claim 13, wherein the discharger discharges the low voltage node to a negative voltage.

19. The method according to claim 18, wherein the low voltage node is discharged to the negative voltage at a point of time when an enable signal to activate the drive voltage generation circuit is rendered to an active state.

* * * * *